No. 655,826. Patented Aug. 14, 1900.
F. KAHRS.
GLUE POT.
(Application filed Aug. 19, 1897.)
(No Model.) 2 Sheets—Sheet 1.

WITNESSES:

INVENTOR

BY

ATTORNEY.

No. 655,826.

F. KAHRS.
GLUE POT.
(Application filed Aug. 19, 1897.)

Patented Aug. 14, 1900.

(No Model.)

2 Sheets—Sheet 2.

WITNESSES:

INVENTOR

BY

ATTORNEY

UNITED STATES PATENT OFFICE.

FRIMAN KAHRS, OF NEW YORK, N. Y.

GLUE-POT.

SPECIFICATION forming part of Letters Patent No. 655,826, dated August 14, 1900.

Application filed August 19, 1897. Serial No. 648,762. (No model.)

*To all whom it may concern:*

Be it known that I, FRIMAN KAHRS, a citizen of the United States, residing at New York, in the county and State of New York, have invented certain new and useful Improvements in Glue-Pots, of which the following is a specification.

My invention relates to certain details of improvement made by me on the glue-pot shown, described, and claimed by me in my United States patent numbered 498,717 and dated May 30, 1893.

In my present invention I have sought to simplify the means for weighing the glue used or to be used and to minimize the attendant loss in usage to the smallest possible factor and to provide an efficient way of heating such pots by steam. I also provide a novel means for the prevention of the formation of skin and crust upon the upper surface of the glue while it is in use, thus effecting great economy in the employment of the glue in this respect for the reason that no skin or film or crust being permitted to form the entire contained quantity of glue is kept in a usable condition at all times.

I will now proceed to describe the apparatus by means of which I effect the benefits rehearsed, which apparatus is illustrated in the accompanying drawings.

Figure 1:
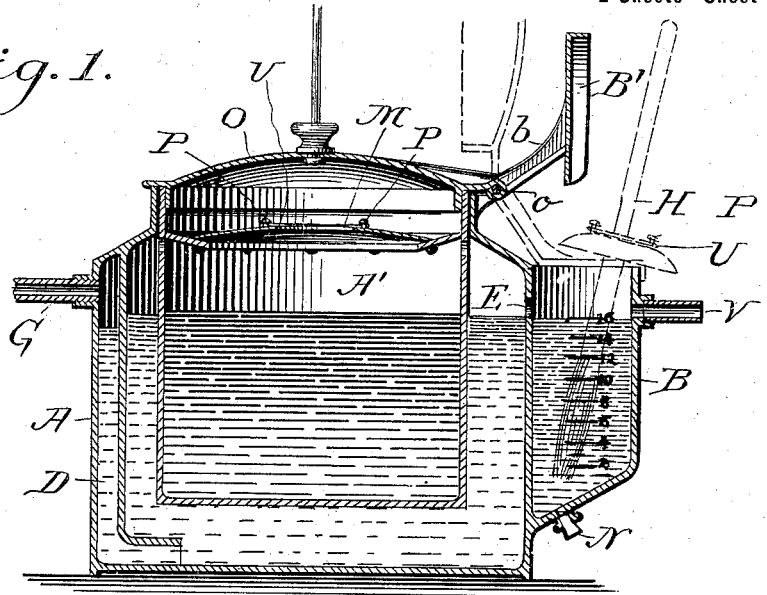
Figure 2:
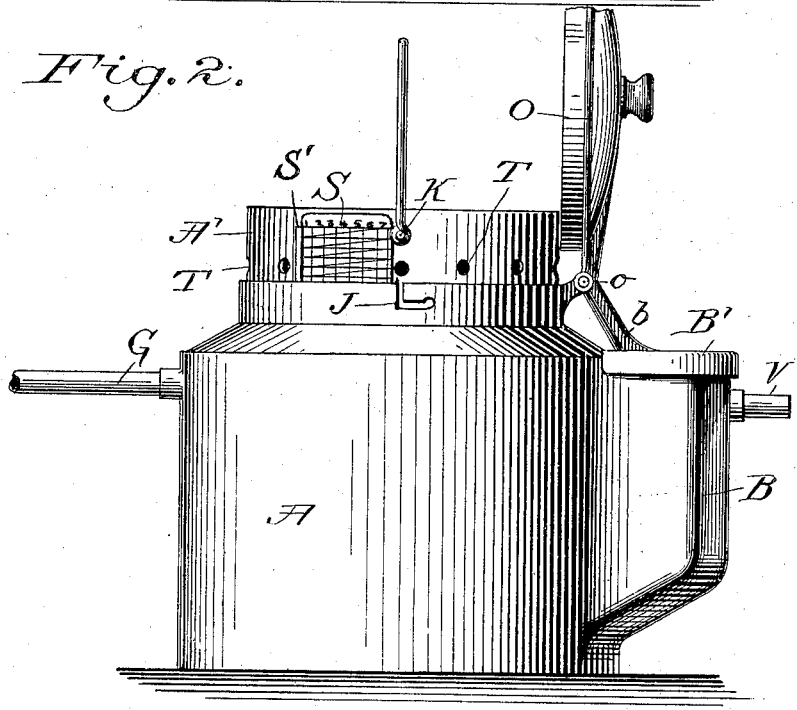
Figure 3:
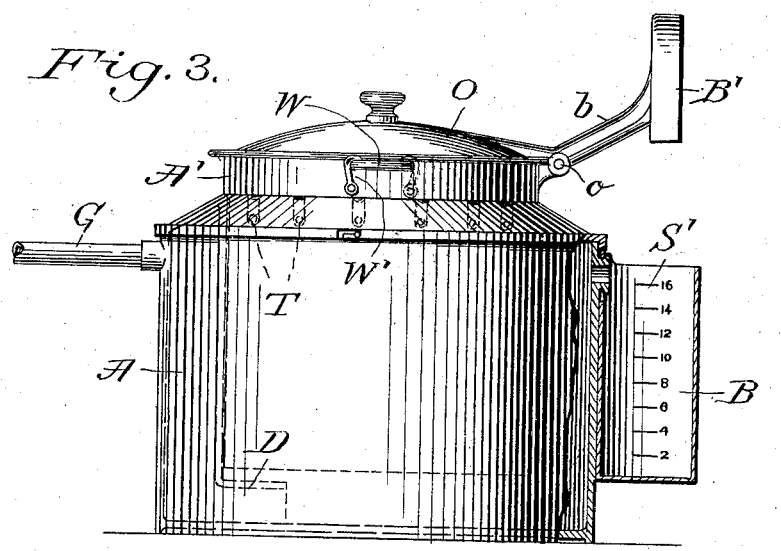
Figure 4:
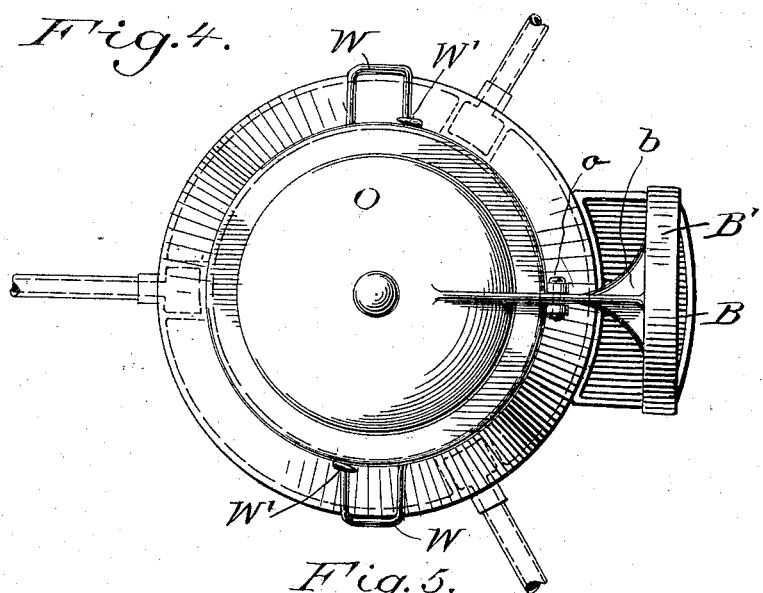
Figure 5:
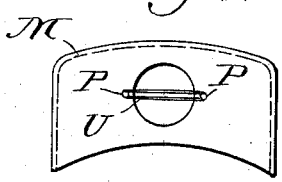

In the drawings, Figure 1 represents a vertical section of my improved apparatus. Fig. 2 is a side elevation of same. Fig. 3 represents a side elevation embodying a slight modification. Fig. 4 represents a plan view, and Fig. 5 a detail.

In my former patent above referred to the weighing of the materials to be used, such as glue, was accomplished by means of an overflow of water, which water was caught and retained in a suitable vessel and the amount of glue introduced into the glue-pot, which as it sank displaced the water determined. In my present form of glue-pot this weighing is not done by the displacement of water, as in the former case, but is accomplished by means of a measuring device upon the glue-pot proper, which as it descends indicates the amount of glue introduced, employing the water as a counterbalance.

I provide an outside vessel A, in which the water is contained, and the inner vessel or glue-pot proper, A'. A brush-compartment is formed at B upon the exterior of the outer vessel, and the outer vessel is also provided with a bayonet-joint J for retaining the glue-pot in position, the glue-pot being provided with pins K, entering the bayonet-joint for that purpose. At E is an overflow-pipe forming a way between the vessel A and the brush-compartment B. The inner vessel is while empty depressed into the bayonet-joint and locked there until the water in the outside vessel A and in the brush-compartment B has found a constant level through the overflow-pipe E. It is then released and will by the pressure of the water, as it is empty, be driven upward, occupying the position shown in Fig. 2. If any object is placed in it, the weight of such an object will sink the vessel and drive the water upward, the water acting as a counterpoise. The weight placed in the vessel can be read off against the edge of the outer vessel if a suitable scale S, sliding in guide-folds S', be placed on the side of the glue-pot. The advantages which I gain by using this method of weighing are, first, that the weight in the inner vessel is at once counterbalanced with water and so more rapidly and better ascertained than if I wait until the water has found a true level through an aperture; second, by both immersing the cylinder and raising the water-level it is possible to use a larger scale for weighing and a smaller quantity of water as a counterpoise, because the sum total of immersion and the raising of the water-level must be shown on the scale, and, third, the weighing can be done by displacement.

In Fig. 3 is shown a slight variation of the glue-pot drawn in Fig. 1, the difference being that in Fig. 3 the brush-compartment is detachable, while in Fig. 1 it is cast on the pot. This detachable compartment, as well as the fixed one, can have a scale indicating the weight of water of such a volume as the mark shows. If the glue-pot is balanced against the water in the outer pot, so as to make a level through the aperture, any object placed in the inner pot will displace its own weight in water through this aperture into the detachable or into the fixed brush-compartment, and it can be read off against the scale as so much weight.

I will now proceed to describe that part of my apparatus which refers to the means for preventing the formation of skin and crust on the surface of the glue and also on the walls of the glue-pot. This is caused by the evaporation of the water and by the contact of the dry cool atmosphere. To overcome this drawback, I have found that steam must be brought over the surface from another source than the inner glue-pot itself. This I accomplish by providing the inner pot with steam-holes T, that conduct the vapor from the outside pot to the inside pot. These steam-holes are above the water-level of the outside pot. If it is necessary to fill the inside pot to the rim, these steam-holes are each fitted with a short piece of pipe that leads the steam to the top and to the surface of the inner pot, where the vapor condenses under the lid and flows back in the pot, as shown in Fig. 3. On smaller pots or wherever a scraper is needed these steam-holes are placed right under the scraper.

The outside pot is provided with a cover O. This cover will when the pot is not used protect the glue-surface from skin and prevent the formation of a crust or the drying up or thickening of the glue, as enough vapor condenses under the cover and drops into the glue-pot to counteract it; but when in use the cover O remains off, and the glue liquid is then protected by a loose shield M, (see detail view, Fig. 5,) stuck on the brush-stick H and held there by a rubber string U, wound around two rivet-heads or pins P. This shield acts with the steam-holes as a preventive against the formation of skin and crust, and being on the brush it is always over the glue-pot when in use and not in the way when the workman uses the brush. The shape of this shield may correspond to the opening in the glue-pot and to the shape of the brush-compartment B, cast onto the glue-pot, so that the shield can be utilized as a cover for the brush-compartment.

The double cover compels the workman to remove the brush from the pot when his work is done and also to remove the brush when he wishes glue, thereby offering an effective covering of the glue in both cases; but a glue-pot without brush-compartment and this double cover will be effectually guarded against skin or crust if the inner pot has the steam-holes and the brush-shield.

The heating of the pot is done in the following way: The steam enters and condenses in the pot and keeps the water to the boiling-point in the outside pot and heats the inside pot somewhat less. It enters through the steam-holes and fills the space over the inside glue-pot with condensing vapor. It maintains a constant level of water in the outside pot and the brush-compartment, both being always full; but no water can enter the inside pot, as the level of the steam-holes is above the water-level of the outside pot.

The outer water-containing pot is heated by steam or steam is conveyed into the pot through opening G into a conduit D, the latter formed integrally with the glue-pot, as shown in Fig. 1, and extending down and upon the inside wall of the said glue-pot and leading into the same at the bottom thereof. The same way can be employed for admitting the hot or cold water and can be given such a shape as to act as guides for the glue-pot in its up-and-down movement.

A novel and effective cover is obtained by hinging the cover O to the outer pot A at o, and it is provided with an arm b, which supports a cover B'. This latter is adapted when the pot is in use and the brush is not in the brush-compartment, but in the glue-pot proper, to fit over and form a cover for the brush-compartment, as shown in Fig. 2. A draining-plug N is shown for emptying the brush-compartment of water, and an overflow-pipe is shown at V.

The use of the glue-pot with steam-holes from the outer pot to the inner pot is only practicable in such a pot that has an outlet by the aid of which the water in the outer pot is prevented from rising above such an outlet, thus cutting off the possibility of entering the steam-holes and spoiling the glue. In other words, the water-outlet from the outer pot must be below the steam-inlet into the inner pot.

In Fig. 3 I have shown a removable brush-compartment and have provided it with a scale S', which may be utilized to indicate the stand of water in the outer pot or to show when the refilling is necessary, as the evaporation in both will bear some proportion to each other.

In the forms shown in Figs. 3 and 4 I employ handles W, where the glue-pots are on a large scale, and use hooks W' to catch over said handles to hold the glue-pot in position. This is in lieu of the bayonet-joint shown in Fig. 2.

The brush-compartment furnishes means for the overflow of water or for surplus water contained in the outer pot when the inner pot is immersed and when the apparatus is heated over an open fire or in any way where steam is not employed for the heating purpose. A great part of the water evaporated will recondense under the cover of this compartment, and when the water here begins to get low this may indicate the necessity of refilling.

The removable topping prevents the escape of steam during the heating and gives an easy access to the inside for cleaning and repairing purposes.

The guide-folds for the weighing-scale make it possible to adjust the position of this scale and to start the weighing from zero even if the pot is not quite empty.

The locking of the glue-pot proper or the holding down of same by hooks is necessary for two reasons: (a) to prevent the pot from being driven up while emptied, as this would prevent the use of the main cover; (b) to procure the correct amount of water necessary as a counterpoise in the outside pot. If the pot was not locked, the continually-condensing water would drive the pot upward, and to create the proper level and have the correct counterpoise of water above the glue-pot proper would have to be depressed anew each time it was refilled, and if the pot is a large one this is quite a laborious task.

From the foregoing description it will be seen that I have provided a glue-pot comprising an outer vessel, an inner vessel having a vapor-inlet through which vapor may enter from the outer vessel, and means in connection with the inner vessel for trapping and delivering back into it the moisture of condensation or part of it, so that the glue will remain in proper condition for use and the formation of a skin upon it will be prevented. The means for trapping and delivering back into the inner vessel the moisture of condensation, broadly considered, consists of a downwardly-extending part, so that moisture which collects upon the cover may not run outside of the vessel. Such downwardly-extending part in connection with the inner vessel may take a number of different forms; but I prefer to employ a tapering form for the upper part of the inner vessel, and particularly to employ a tapering or conical or dished form for the cover. This cover so formed is preferably provided with an opening for admission of the brush or other instrument employed for applying or stirring the glue or an enlarged opening which adapts the cover to be employed as a scraper. Such a cover or scraper with an enlarged opening also serves the additional purpose of not confining too much of the vapor when excessive pressure is used in the outer vessel, while trapping or condensing ample moisture to keep the glue in condition.

Having thus described my invention, what I claim as new, and desire to secure by Letters Patent, is—

1. The combination of an outer water or steam containing pot, an inner glue-pot having steam-holes, and a scraper fastened to said inner pot above the steam-holes, with a removable cover for the inner pot.

2. The combination of an outer water or steam containing pot, an inner glue-pot having steam-holes, and a downwardly-inclined ledge forming a scraper and fastened to said inner pot above the steam-holes, with a removable cover supported upon said downwardly-inclined ledge or scraper, as and for the purpose set forth.

3. In a glue-pot, the combination of an outer pot, an inner pot having a downwardly-inclined annular ledge forming a scraper as shown, a removable cover supported on said ledge and adapted to close the inner pot, and a brush affixed to the movable cover and adapted to pass freely through the opening formed by the annular ledge.

4. In a glue-pot, the combination of an outer and inner pot, the inner pot having a ledge or scraper as shown, a removable cover, a brush-compartment and a brush, the latter being affixed to the movable cover, said cover being adapted to fit the glue-pot and the brush-compartment, as and for the purpose set forth.

5. In a glue-pot, an outer pot having several steam or water ways cast integrally therewith or fastened thereon for conveying steam, hot or cold water to the inside of the pot, and at the same time serve as guides, in combination with the inner pot guided upon said ways.

6. The combination of a glue-pot substantially as hereinbefore shown and described, of an inner and outer pot and brush-compartment, the said glue-pot having a lid adapted to cover either the inner or the outer pots when closed, with a second cover adapted to close the brush-compartment when the main cover is raised.

7. The combination with the outer pot, having an overflow for securing a constant volume of water therein, of an inner pot capable of vertical movement in said outer pot and guided therein, and having a scale for indicating the amount of immersion of same in the water, and means for holding the inner pot in its lowermost position.

8. In a self-weighing glue-pot, the combination with the outer pot, of the inner pot sliding vertically therein and having an adjustable scale and guide-folds on the inner pot for supporting the said adjustable scale and allowing of vertical adjustment of same.

FRIMAN KAHRS.

Witnesses:
HERBERT KNIGHT,
J. GREEN.